(12) United States Patent
Karem (10) Patent No.: US 8,387,913 B2
(45) Date of Patent: Mar. 5, 2013

(54) COMPACT AIRCRAFT WING FOLDING SYSTEMS AND METHODS

(76) Inventor: Abe Karem, Tustin, CA (US)

( * ) Notice: Subject to any disclaimer, the term of this patent is extended or adjusted under 35 U.S.C. 154(b) by 0 days.

(21) Appl. No.: 13/206,001

(22) Filed: Aug. 9, 2011

(65) Prior Publication Data

US 2012/0292436 A1 Nov. 22, 2012

Related U.S. Application Data (63) Continuation-in-part of application No. 13/205,870, filed on Aug. 9, 2011.

(60) Provisional application No. 61/372,941, filed on Aug. 12, 2010.

(51) Int. Cl.
*B64C 3/56* (2006.01)

(52) U.S. Cl. ............... 244/49; 244/102 SL; 244/54

(58) Field of Classification Search ........... 244/49, 244/54, 3.27–3.29, 102 SL, 120, 46
See application file for complete search history.

(56) References Cited

U.S. PATENT DOCUMENTS

| | | | | |
|---|---|---|---|---|
| 2,290,850 A * | 7/1942 | Umschweif | ............... | 244/49 |
| 2,572,421 A * | 10/1951 | Abel, Jr. | ............... | 244/49 |
| 2,623,713 A * | 12/1952 | Foster | ............... | 244/49 |
| 2,674,422 A * | 4/1954 | Pellarini | ............... | 244/49 |
| 2,712,421 A * | 7/1955 | Naumann | ............... | 244/49 |
| 2,925,233 A * | 2/1960 | Dunn et al. | ............... | 244/218 |
| 3,439,890 A * | 4/1969 | Stits | ............... | 244/49 |
| 4,569,493 A * | 2/1986 | Burhans, Jr. | ............... | 244/76 R |
| 4,781,341 A | 11/1988 | Kasper | | |
| 4,881,701 A | 11/1989 | Bullard | | |
| 4,913,375 A | 4/1990 | Fitzpatrick | | |
| 5,201,478 A | 4/1993 | Wooley | | |
| 5,337,974 A * | 8/1994 | Rumberger et al. | ............... | 244/49 |
| 5,379,969 A | 1/1995 | Marx et al. | | |
| 5,381,986 A * | 1/1995 | Smith et al. | ............... | 244/49 |
| 6,260,798 B1 * | 7/2001 | Casiez et al. | ............... | 244/49 |
| 6,260,799 B1 * | 7/2001 | Russ | ............... | 244/49 |
| D461,159 S * | 8/2002 | Miralles et al. | ............... | D12/319 |
| 7,732,741 B1 * | 6/2010 | Whitham | ............... | 244/3.27 |
| 7,938,358 B2 | 5/2011 | Dietrich et al. | | |
| 2003/0089821 A1 | 5/2003 | Miralles et al. | | |
| 2008/0087763 A1 * | 4/2008 | Sheahan et al. | ............... | 244/49 |
| 2009/0206196 A1 | 8/2009 | Parks et al. | | |
| 2009/0224098 A1 * | 9/2009 | Karem | ............... | 244/87 |

OTHER PUBLICATIONS

Clarke, V.C. et al., "A Mars Airplane?", American Institute of Aeronautics and Astronautics, pp. 42-54, 1979.

* cited by examiner

*Primary Examiner* — Christopher P Ellis
*Assistant Examiner* — Medhat Badawi
(74) *Attorney, Agent, or Firm* — Fish & Associates, PC (57) ABSTRACT

An aircraft wing is equipped with asymmetric wing folding hinges to achieve a highly compact folded footprint. One or more of the hinges is advantageously placed at angle with respect to an aircraft centerplane such that the wing tips can fold over the centerplane without touching each other. Preferred aircraft have hinge angles that differ by several degrees such that one wing tip lies in front of the other in a folded configuration. Other asymmetries such as asymmetric hinge placement and asymmetric hinge seam length can be used concomitantly to enhance the compactness of the folded aircraft. Special application to wide span aircraft, high aspect ratio aircraft, and flying wing aircraft is contemplated.

11 Claims, 8 Drawing Sheets

COMPACT AIRCRAFT WING FOLDING SYSTEMS AND METHODS

This application is a Continuation-in-Part of U.S. application Ser. No. 13/205,870 filed Aug. 9, 2011 which claims priority to U.S. Provisional Application No. 61/372,941 filed Aug. 12, 2010, both of which are incorporated by reference herein in their entirety.

FIELD OF THE INVENTION

The field of the invention is aircraft.

BACKGROUND

Aircraft comprise lift-generating surfaces to counter the force of gravity and sustain flight. In general, these lifting surfaces must have a sufficiently large planform area to produce adequate lift. Wings are the dominant lifting surface in most aircraft configurations. For a given wing planform area, a wing with a longer span tends to have increased efficiency at the expense of weight and storage footprint. As wing planform area and wing span increase, it becomes harder to store, transport, and otherwise accommodate aircraft on the ground, on a ship, and so forth.

To better and more compactly accommodate aircraft on the ground, wing folding systems have been developed. Many wing folding systems have been developed for naval fighter aircraft because of the unique requirements for stowage with a small footprint aboard an aircraft carrier or other ship. Most of these aircraft use one or more hinges on each side of the wing to fold or rotate a portion of the wing out of the nominal plane of the wing. Usually, the hinges on the left and right sides of the wing are parallel with the centerline of the aircraft for simplicity of engineering and manufacturing. Examples of this conventional approach include U.S. Pat. No. 2,290,850 to Umschweif, U.S. Pat. No. 2,623,713 to Foster, U.S. Pat. No. 2,712,421 to Naumann, U.S. Pat. No. 2,925,233 to Dunn et al., and more recently U.S. Pat. No. 5,381,986 to Smith. Of all the folding systems, parallel hinges are used on the largest number of operational aircraft, including for example the Boeing F/A-18E/F Super Hornet. Although most folding wing aircraft have wing tips that are quite far apart in the folded configuration, some folding-wing aircraft have wing tips that almost touch over the centerline when folded such as the Hawker Sea Hawk.

A few aircraft, such as the Douglas F4D Skyray, have fold lines that are not parallel to the aircraft centerline to avoid folding ailerons. However, for engineering and manufacturing simplicity, the left and right sides of the wing and fold system are symmetric about the centerplane of the aircraft. The wing tips also remain quite far apart in the folded configuration.

A few aircraft, such as the Fairey Gannet, have used a double fold system whereby the wing has two wing fold hinge assemblies per side, allowing the wing to fold twice for additional compactness. This adds additional weight and complexity to the aircraft. Still further, some aircraft, especially those designed to travel on roads as flying cars, incorporate one or more hinges that allow the wing to fold up and back out of the plane of the wing for compactness. Examples of this latter wing folding approach include U.S. Pat. No. 2,572,421 to Abel, U.S. Pat. No. 2,674,422 to Pellarini, U.S. Pat. No. 3,439,890 to Stits, and the Grumman F6F Hellcat and F4F-4 Wildcat.

Some wing stowage systems have been designed for missiles and munitions, which vary wing sweep without folding hinges to achieve compact stowage. Examples of such systems include U.S. Pat. No. 7,732,741 to Whitham, US D461159 to Mirales, et al, and the Small Diameter Bomb. For munitions, it is generally desirable to unfold the wings upon deployment. Some aircraft, such as the Bell/Boeing V-22 Osprey and U.S. Pat. No. 5,337,974 to Rumberger rotate the entire wing in the plane of the wing for compact stowage. Because these wings only rotate in plane, and do not fold out of plane, these are not considered wing folding systems.

Some other aircraft have variable wing sweep, including for example, the Grumman F-14 Tomcat, the General Dynamics F-111 Aardvark, and U.S. Pat. No. 4,569,493 to Burhans, et al. The predominant motivation for the variable sweep is to tailor performance to different flight speeds. As used herein, the term "wing folding system" does not encompass variable wing sweep systems that rotate wings in the plane of the wing during flight.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

What all these prior art wing folding systems have in common is that they are symmetric systems, with symmetric wings and folding systems about the aircraft centerline, resulting a symmetric compact folded configuration. In particular, simple wing fold hinge lines parallel to the centerline are aerodynamically efficient, as they disturb only a small sliver of the airflow over the wing. Such symmetric designs also provide benefits in the form of common engineering processes and parts between left and right wings.

Even with the use of prior art wing folding systems, aircraft with especially long wing spans and high aspect ratios still have a large on-ground stowage footprint. Thus, there is still a need for a wing fold system that provides for increased compactness as compared with prior art systems.

SUMMARY OF THE INVENTION

The inventive subject matter provides apparatus, systems and methods in which a wing is equipped with asymmetric left and right wing fold hinge assemblies.

In a preferred class of embodiments, an aircraft has a wing with left and right sides disposed about a centerplane, and at least one of the left and right sides has a hinge oriented at an angle of at least two degrees with respect to the centerplane. To a non-critical reader, a deviance off the centerplane of only two degrees might seem small, but in aircraft manufacturing tolerance is typically very tight, and a variance of two degrees is actually quite significant. In the inventive subject matter discussed herein, the variance is important because it allows the left and right tips of the wing to fold over the centerplane. Greater variances are also contemplated, including for example at least five, ten, fifteen, twenty or even forty degrees, with the higher variances off centerplane contemplated to be practical for relatively lower wingspan aircraft.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Although one might expect that hinges for a hinged wing aircraft would be equidistant from the centerplane, it is also contemplated that an asymmetric arrangement would be advantageous to attain increased compactness in folding.

This is a function of one the wing tips being disposed forward of the other wing tip in the folded configuration. In preferred embodiments the left and right mean hinge distance from the centerplane can advantageously differ in magnitude by a least one percent, and more preferably at least two percent. This compares with typical aerospace manufacturing tolerance measured in hundredths or thousandths of a percent.

In theory, the most compacted configuration that a wing can achieve for a single fold on each side is for the compacted configuration to be one third of the unfolded configuration. But with a symmetric configuration and single folds and the wing folding nearly back on itself, one cannot expect the compacted configuration to be less than one half the unfolded configuration. The reason is that the wings tips would touch at the centerplane. Naturally, one could fold the wings such that they are oriented upwards in a compacted configuration, but this incurs a significant height penalty. By orienting the folds away from the centerplane, and concomitantly locating the hinge seams lines at different mean distances from the centerplane, embodiments contemplated herein can approach the theoretical maximum. To point, a right wing folding hinge can be disposed at a right mean hinge distance from the centerplane that is less than 34%, 40%, 45%, 50%, or even 60% of a right wing semi-span.

Viewed from another perspective, the fold lines can advantageously be disposed to define inboard (non-folding) and outboard (folding) wing portions such that the combined left and right folding planform areas are between 25% and 200% of the combined left and right non-folding planform areas, more preferably between 40% and 120%, and still more preferably between 50% and 90%. In especially preferred embodiments, the combined left and right folding planform areas are at least 60% of the combined left and right non-folding planform areas.

Although it is might seem optimal to use fold lines that are the same lengths on the left and right sides of the wing, it is contemplated that one could use fold lines having different lengths. For example, it is contemplated than an aircraft could have left and right wing hinge seam with lengths that differ by at least 2%, 5%, 7% or even 10%.

Many different types of aircraft can take advantage of the teachings herein, but these teachings are contemplated to be especially valuable to long wing span (high aspect ratio), high efficiency aircraft. Some such aircraft could be of the "flying wing" variety having no empennage, and other aircraft could be have an airfoil profile shape configured for natural laminar flow with an upper surface laminar flow extent of at least 30%. It is still further contemplated that system could be assembled comprising a given fuselage and inboard wing portions that could be used with different sets of outboard wing portions. Replacing the outboard wing portions should be relatively easier in aircraft according to the inventive ideas herein than in traditional aircraft because the wing is already divided at the hinge seams.

Although one could achieve many of the compactness features contemplated herein using multiple wing folding hinges on each side of an aircraft, and possibly with trammel or other compound hinge arrangements, it is contemplated herein that sufficient compactness can be achieved by use of only a single, simple hinge or a hinge with rotational elements in a very small radius for folding on each side of the aircraft.

BRIEF DESCRIPTION OF THE DRAWING

FIG. 6A is a plan view drawing of an especially preferred folding wing aircraft, while FIGS. 6A-6C are drawn to scale.

FIG. 8B is a detailed side view illustration of the same assembly in a folded configuration, while FIG. 8C shows is a side view illustration of the same assembly in an unfolded configuration.

DETAILED DESCRIPTION

Various objects, features, aspects and advantages of the inventive subject matter will become more apparent from the following detailed description of preferred embodiments, along with the accompanying drawing figures in which like numerals represent like components. The explanation and definition of aircraft components, dimensions, and orientations are illuminated through FIGS. 1A-1C and 2A-2C, which illustrate a folding-wing airplane generally according to the prior art as described in the background section. FIGS. 3A-3C and 4A-4C illustrate how a substantially similar aircraft can achieved increased compactness of a folded configuration in accordance with aspects of the present inventive subject matter.

Figure 1A:
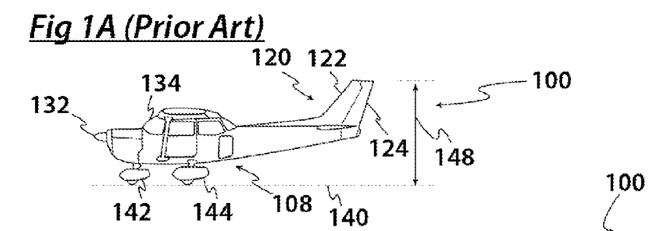
FIGS. 1A, 1B, and 1C are side, front, and top view illustrations respectively of a folding-wing airplane in an unfolded configuration generally according to the prior art.
Figure 1B:
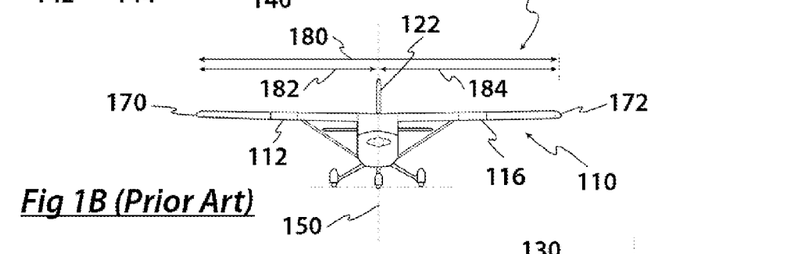
Figure 1C:
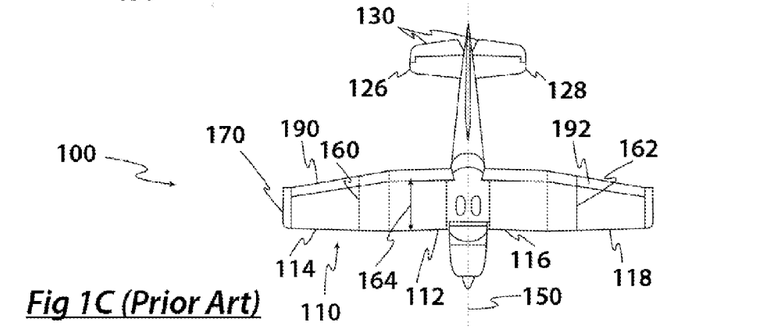

FIGS. 1A, 1B, and 1C show side, front, and top views respectively of a folding-wing aircraft 100 in an un-folded configuration generally according to the prior art. The aircraft centerplane 150 defines left and right sides of the aircraft 100 with respect to an observer behind the aircraft facing forward, where forward is the direction of normal aircraft flight. The aircraft 100 comprises a wing 110, having a right inboard portion 112, a right outboard portion 114, a left inboard portion 116, and a left outboard portion 118. The extreme right end of the wing defines a right wing tip 170, while the left end of the wing defines a left wing tip 172, the tip being the portion of the wing 110 that is farthest away from the aircraft centerplane 150. The wing 110 has an overall span indicated 180, defined as the overall length from the left wing tip 172 to the right wing tip 170. The right wing has a semi-span indicated by arrow 182, which is the length from the aircraft centerplane 150 to the right wing tip 170. Similarly, the left wing has a semispan indicated by arrow 184, which is the length from the centerplane 150 to the left wing tip 172. For conventional symmetric aircraft such as aircraft 100, the left and right semispans 182, 184 are equal and sum to the overall wing span 180. In this way, aircraft 100 may be viewed as having a single wing 110, with left and right portions, or equivalently, left and right wings. The two terminologies are used interchangeably in this specification. The right portion of the wing 110 comprises a right inboard portion 112 and a right outboard portion 114.

The aircraft 100 further comprises a fuselage 108, typically configured to carry payload including cargo, fuel, and/or passengers, and often comprising a cockpit 134 that can accommodate a pilot and a flight control system (not shown). The aircraft 100 is powered by a motor 132 coupled to a propeller (not shown) or other propulsive means such as a turbofan, rotor, or jet engine. An empennage 120 comprises a vertical tail 122 with a rudder 124 and a right horizontal tail 126 and left horizontal tail 128. An elevator 130 is a flapped portion of the horizontal tail 126,128. As used herein, the terms "tail" and "empennage" are used interchangeably. The aircraft control system (not shown) allows flight control of the aircraft 100 through manipulation of the rudder 124, elevator 130, and ailerons 190,192, which are flapped portions of the wing 110.

The aircraft 100 is also equipped with nose landing gear 142 and main landing gear 144 that cooperate to support the aircraft 100 on the ground 140 when landed, parked, taxiing, or driving on the ground. On the ground, the aircraft has a height indicated by arrow 148 and measured from the ground 140 the highest point on the aircraft 100. In FIG. 1A, the highest point on the aircraft is the tip of the vertical tail 122, but in other aircraft could be a nose, a rudder, a radome, a fuselage, a mission pod, or other component. As shown, aircraft 100 has no additional height penalty relative to the top of the tail 122. However, there are aircraft (not shown) in the prior art in which folding incurs a substantial height penalty, which might be 5%, 10%, or even 40% or more relative to the overall height of the unfolded aircraft.

Figures 2A, 2B:
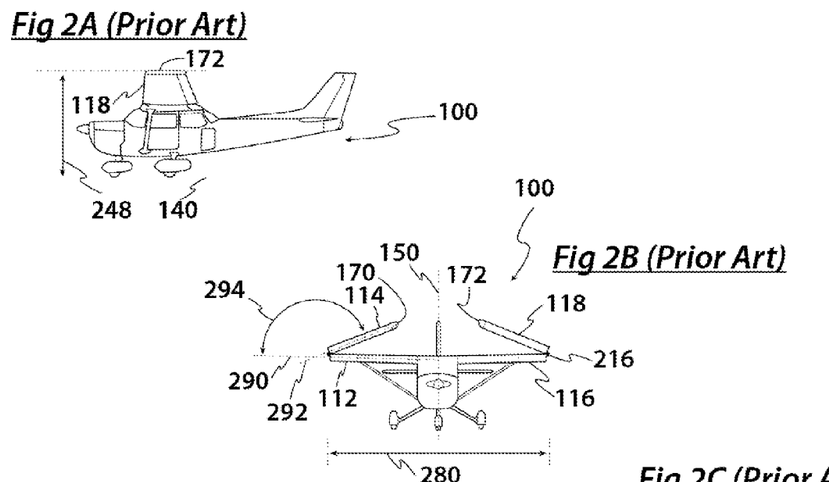
FIGS. 2A, 2B, and 2C are side, front, and top view illustrations respectively of the same folding-wing airplane of FIGS. 1A-1C but in a folded configuration.
Figure 2C:
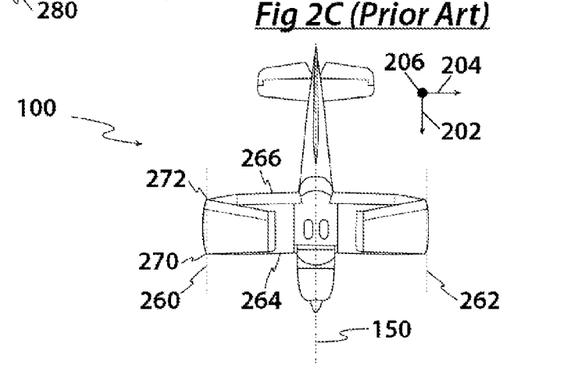

To facilitate folding, the wing 110 has a right folding hinge seam 160 that allows for the rotatable coupling of the wing right outboard portion 114 and right inboard portion 112. The wing also has a left folding hinge seam 162 that facilitates wing folding through rotation of the wing left outboard portion 118 with respect to the left inboard portion 116. The wing 110 has a planform area which is defined as the projected area when viewed from above as in FIG. 1C. The aspect ratio of the wing is defined as the square of the wing span 180 divided by the wing planform area. It can be seem that this prior art aircraft has a symmetrical wing about the centerplane, symmetrical folds, and therefore it has a symmetrical folded configuration FIGS. 2A, 2B, and 2C show side, front, and top views respectively of the same prior art folding-wing aircraft 100 of FIGS. 1A, 1B, and 1C but in a folded configuration. In a folded configuration, the wing outboard portions 114,118 are folded up and over the wing inboard portions 112, 116. In this folded configuration, the aircraft 100 has a folded height 248 that may differ from the unfolded height 148. As shown in FIG. 1A, the aircraft unfolded height 148 is the distance measured between a substantially flat and level surface or ground 140 and the highest portion of the aircraft, in this case the wing tip 172, in a wheels down landed configuration. The folded aircraft also has a folded width 280 between the left and right portions of the aircraft 100 farthest outboard of the centerplane 150. In most cases, this width 280 will be less than the wing span 180 of the unfolded aircraft.

The right wing inboard portion 112 defines a wing dihedral line 290 with respect to the aircraft front view as shown in FIG. 2B. For the aircraft of FIGS. 1B and 2B, the wing right outboard portion 114 lies along this dihedral line in the unfolded configuration, but forms a folded cant line 292 in the folded configuration. Thus, the aircraft wing right outboard portion is rotated or folded through an angle indicated by arrow 294 to convert from the unfolded to folded configurations. It should be noted that the aircraft 100 is symmetric, but that the dihedral line 290 is not necessarily parallel to the plane of the ground 140. In the folded configuration, the right wing tip 170 lies over the right wing inboard portion 112, but remains on the right side of the aircraft centerplane 150. In consideration of the alternate viewpoints of FIGS. 2B and 2C, it should be noted that the aircraft centerplane 150 is a plane of symmetry. A wing folding hinge assembly 216 mechanically and rotatably couples wing left outboard portion 118 with the wing left inboard portion 116.

Viewed from above in FIG. 2C, the right wing folds or rotates about a folding axis 260, while the left wing folds about a folding axis 262. The folding axes 260,262 are parallel to each other, are parallel to the aircraft centerplane 150, and are symmetric about the aircraft centerplane 150. Further, a right wing folding hinge seam 160 intersects with a point 270 on the wing leading edge 264 and a second point on the wing trailing edge 266. The projected distance between these points is the hinge seam length 164 (see FIG. 1C).

As used herein, the plane of the wing refers to the plane defined by the dihedral line 290 and the line that runs between points 270, 272 at the intersection of the wing folding hinge seam and leading and trailing edges 264, 266 of the wing 110. Also as used herein, a wing that folds "out of plane" is defined as one that rotates about an axis that is within twenty degrees of the axes that define the wing plane. Similarly, a wing that rotates "in the plane" of the wing is defined herein as one that rotates about an axis that is within twenty degrees of perpendicular to the axes that define the wing plane. It is contemplated that left and right wings may define different planes due to dihedral. For typical aircraft, the wing plane is within thirty degrees of being parallel to the ground plane in a parked condition. An aircraft coordinate system that may be useful understanding these concepts is shown in FIG. 2C, where the x-axis 202 points forward generally in the direction of flight along the aircraft station line, the y-axis 204 points laterally along the aircraft buttline, and a z-axis 206 comes out of the plane of the figure along the aircraft waterline. The lateral plane is defined as the x-y plane, and the longitudinal plane is defined as the y-z plane.

Figure 3A:
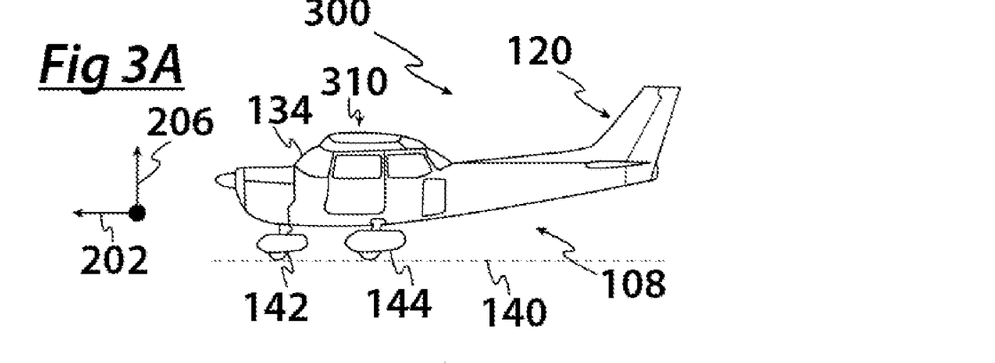
FIGS. 3A, 3B, and 3C are side, front, and top view illustrations respectively of a preferred folding-wing airplane configured according to the present teachings in an unfolded configuration.
Figure 3B:
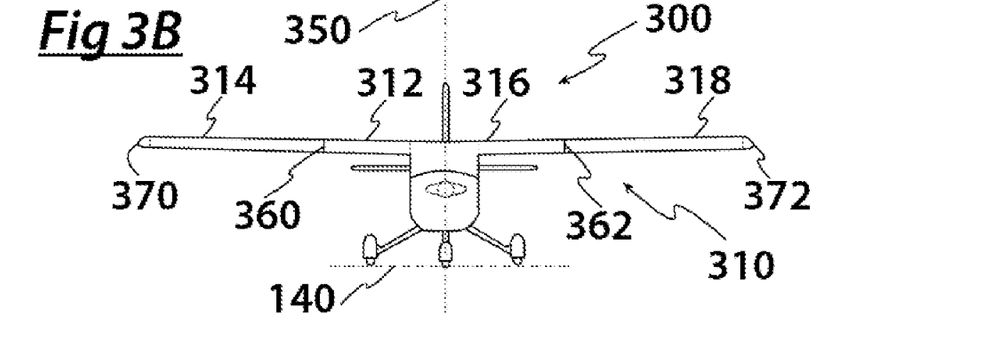
Figure 3C:
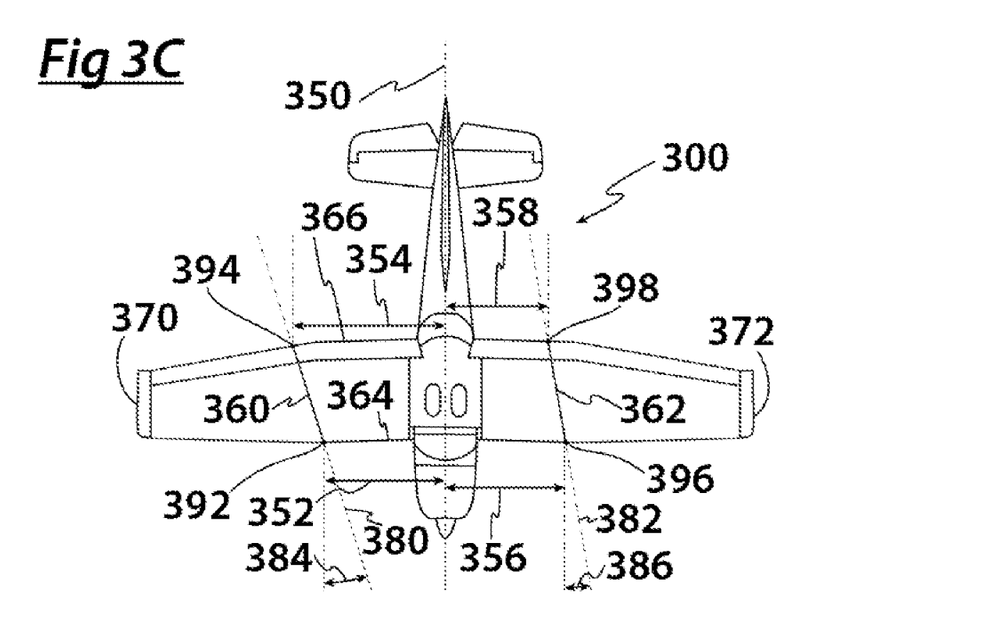

FIGS. 3A, 3B, and 3C show side, front, and top views respectively of a preferred folding-wing airplane 300 configured according to the teachings herein, in an unfolded configuration on the ground after landing. Other than the wing folding system, preferred aircraft 300 is dimensioned and configured substantially like the aircraft 100 of FIGS. 1A, 1B, and 1C. In their respective unfolded configurations, aircraft 100 and 300 have identical widths, spans, heights, and lengths. The preferred aircraft 300 is equipped with substantially the same tail 122, fuselage 108, cockpit 134, and landing gear 142, 144 as aircraft 100. The wing 310, however, is configured to fold in a preferred manner for increased compactness. As shown in FIG. 3A, the aircraft has a coordinate system with an x-axis 202 pointing forward generally in the direction of flight along the aircraft station line, and a z-axis 206 along the aircraft waterline. When landed and resting on the ground 140, the unfolded aircraft 300 has a station line that is near parallel to the plane of the substantially flat and level ground surface 140.

As shown in FIG. 3B, an x-z centerplane 350 defines left and right sides of the aircraft 300. The wing 310 comprises a non-folding right inboard portion 312, a non-folding left inboard portion 316, a folding right portion 314, a folding left portion 318, a right tip 370, and a left tip 372. A first wing folding hinge creates a first folding hinge seam 360 on the right side of the aircraft, while a second wing folding hinge is associated with a second folding hinge seam 362 on the left side of the aircraft.

FIG. 3C is a top or plan view of the preferred aircraft 300 in an unfolded or flight configuration, which is bisected by the centerplane 350. The wing 310 has a planform area defined as the total area of the wing as projected onto the x-y plane as shown in FIG. 3C. The wing further has a non-folding area defined as the sum of the planform areas of the non-folding right inboard portion 312 and the non-folding left inboard portion 316. Similarly, the wing has a folding planform area defined as the sum of the planform areas of the folding right outboard portion 314 and the folding left outboard portion 318.

The right portion of the wing 310 folds about a first folding axis 380, which has a first hinge angle 384 with respect to the aircraft centerplane 350. Equivalently, the folding axis 380 has this same angle 384 relative to any line parallel to the centerplane in the plan view. The left portion of the wing 310 folds about a second folding axis 382 which has a second hinge angle 386 with respect to the aircraft centerplane 350. In preferred embodiments, these angles are advantageously configured to be in anti-symmetric directions with different magnitudes. It is contemplated that well-chosen hinge folding axis angles allow the aircraft to fold into an especially compact configuration such that the left wing tip is at least partially disposed on the right side of the aircraft centerplane in a folded configuration.

To fold the aircraft wing, it is contemplated that a seam is needed that runs around the wing. In the plan view of FIG. 3C, the right folding hinge seam 360 runs parallel to the right folding axis 380. The right folding axis 380 intersects the wing leading edge 364 at a right leading point 392, while the same right folding axis 380 intersects the wing trailing edge 366 at a right trailing point 394. In the plan view, the right leading point 392 is positioned at a right leading distance 352 from the aircraft centerplane 350 whole the right trailing point 394 is positioned at a right trailing distance 354 from the aircraft centerplane. The average of these two values is defined as the right wing hinge mean spanwise location. The straight line distance between the right leading point 392 and the right trailing point 394 in the plan view defines the right wing hinge seam length.

The same general arrangement is found on the left side of the aircraft, although angles and distances differ for preferred aircraft configurations. The left outboard folding portion 318 is separated from the left inboard portion 316 of the wing by a left folding hinge seam 362. A left folding axis 382 intersects the wing leading edge 364 at a left leading point 396 while the same left folding axis 382 intersects the wing trailing edge 366 at a left trailing point 398. In the plan view, the left leading point 396 is positioned at a left leading distance 356 from the aircraft centerplane 350 while the left trailing point 398 is positioned at a left trailing distance 358 from the aircraft centerplane 350. The average of these two values is defined as the left wing hinge spanwise location. The straight line distance between the left leading point 396 and the left trailing point 398 in the plan view defines the left wing hinge seam length.

In preferred aircraft, the wing folding geometry is configured in an asymmetric manner. Preferably, the left leading distance 356 differs from at least one of the right leading distance 352 and the left trailing distance 358. Likewise, the right trailing distance 354 is preferably configured to be different from at least one of the left trailing distance 358 and the right leading distance 352. The first and second (right and left) folding axes 380, 382 are preferably configured to have angles 384, 386 with respect to the centerline that differ in magnitude by at least 1°, 2°, 3°, 4°, 5°, 8°, 10°, 15°, 20°, 30°, 45° or even more degrees. When the angles 384, 386 differ in a wing of otherwise symmetric planform layout, the left and right wing hinge seam lengths will differ. These lengths can be advantageously configured to differ by 0.5%, 1%, 2%, 3%, 4%, 5%, 10%, 15%, 20%, or even more in preferred aircraft. Further, it can be seen that aircraft advantageously configured according to these teachings will have a planform areas of the folding right outboard portion 314 and the folding left outboard portion 318 that are different, preferably by 0.25%, 0.5%, 0.75%, 1%, 2%, 5%, or even more. In preferred aircraft, the folding planform area is configured to be 25%, 50%, 100%, 150%, or 200% of the non-folding planform area.

Figure 4A:
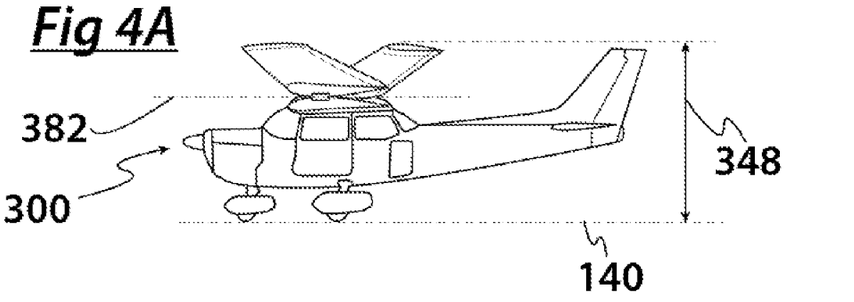
FIGS. 4A, 4B, and 4C are side, front, and top view illustrations respectively of the same folding-wing airplane of FIGS. 3A-3C but in a folded configuration.
Figure 4B:
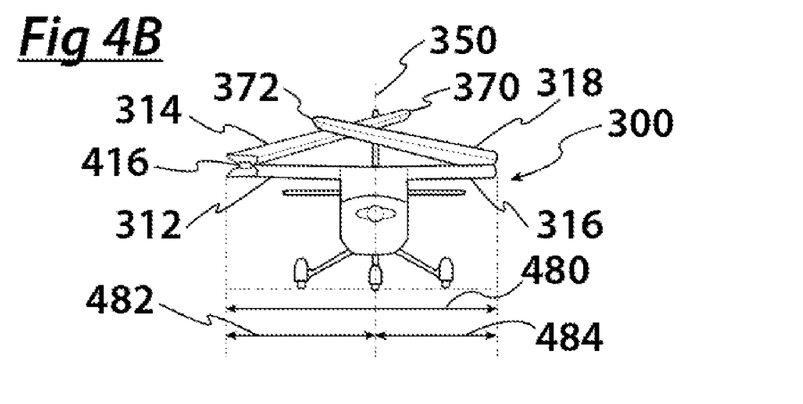
Figure 4C:
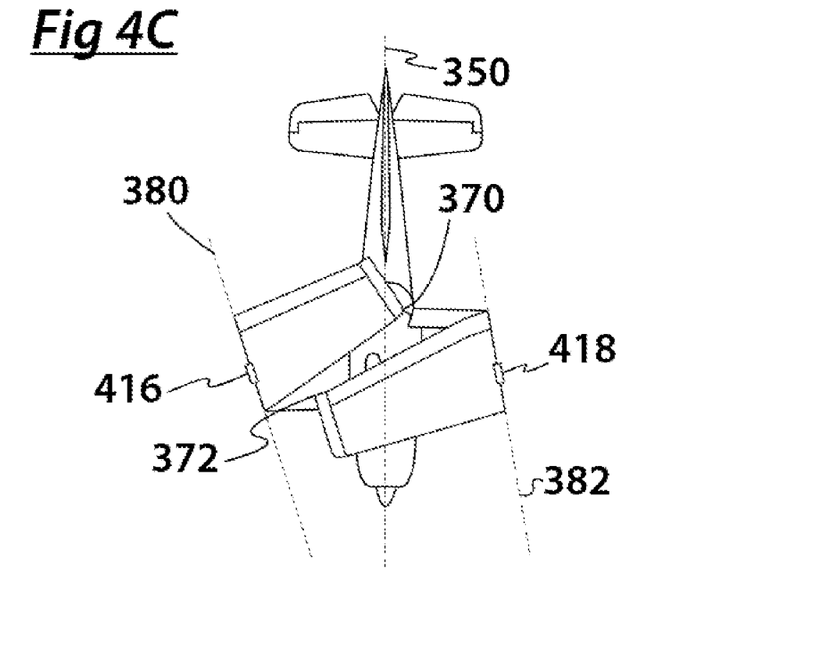

FIGS. 4A, 4B, and 4C show side, front, and top views respectively of the same folding-wing airplane 300 of FIGS. 3A, 3B, and 3C but in a folded configuration. FIG. 4A shows that the preferred aircraft 300 has a height 348 in a folded configuration. Preferred aircraft have a folded height 348 that is not more than 1%, 5%, 20%, 50%, 55%, or 60% greater than the unfolded height. Also, the left wing folding axis 382 has an orientation in the x-z plane with respect to the x-axis 202, and is preferably configured to be within 5°, 10°, or even parallel with the aircraft station line.

FIG. 4B is a front view of the aircraft 300 in the folded configuration, showing that the aircraft 300 has a folded width 480. This folded width 480 is the sum of a right folded width 482 measured from the centerplane 350 the furthest right extent of the aircraft 300 and a left folded width 484 measured from the centerplane 350 the furthest left extent of the aircraft 300. In preferred aircraft, these widths 482, 484 are different in magnitude by at least 0.5%, 1%, 2%, 5%, 10%, or even more.

In the folded configuration, the folding right outboard portion 314 of the wing 310 is rotated about a hinge assembly 416. All suitable means for rotation are contemplated including internal electrical actuation, internal hydraulic actuation, manual rotation, and external actuation. Simple hinges are preferred, in which points on a pivoted body traces out circular paths, although trammel or other compound pivots are also contemplated, in which points on a pivoted body traces out non-circular arced paths.

For preferred aircraft, in the folded configuration, the right wing tip 370 is at least partly disposed on the left side of the aircraft centerplane 350. The right folding portion 314 of the wing 310 is at least partially disposed over the right inboard portion 312 and the left inboard portion 316. Similarly, on the other side, in the folded configuration the left wing tip 372 is at least partly disposed on the right side of the aircraft centerplane 350. This configuration allows for increased compactness as compared with prior art aircraft folding schemes.

FIG. 4C is a plan view of a preferred folded aircraft 300. In this figure, it can be readily observed that the right wing tip 370 lies on the left side of the aircraft centerplane 350 for compact folding. Folding hinge assemblies 416, 418 are configured on the right and left sides of the aircraft, respectively. The generally asymmetrical aircraft arrangement is also apparent, including the different angles of the folding hinge axes 380, 382 with respect to the centerplane 350.

Figure 5A:
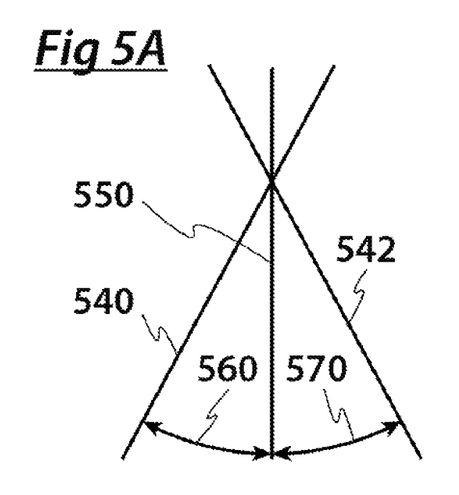
FIGS. 5A, 5B, and 5C are schematic illustrations of geometrical constructions useful defining descriptive terminology related to symmetric, anti-symmetric, and asymmetric angles, respectively.

FIG. 5A is an illustration of a geometrical construction useful for explaining the descriptive terminology of aircraft folding arrangements. In FIG. 5A, a centerline 550 runs longitudinally along the station line and defines first and second sides. A first line 540 defines a first angle 560 with respect to the centerline as shown. On the opposite side, a second line 542 defines a second angle 570 with respect to the centerline 550. As drawn in FIG. 5A, the angles 560, 570 are equal in magnitude and opposite in sign. This is defined as a symmetric arrangement because the first and second sides are mirror images of each other reflected about the centerline. It can also be stated that the first angle 560 and second angle 570 are symmetrically disposed because they are opposite in sign.

Figure 5B:
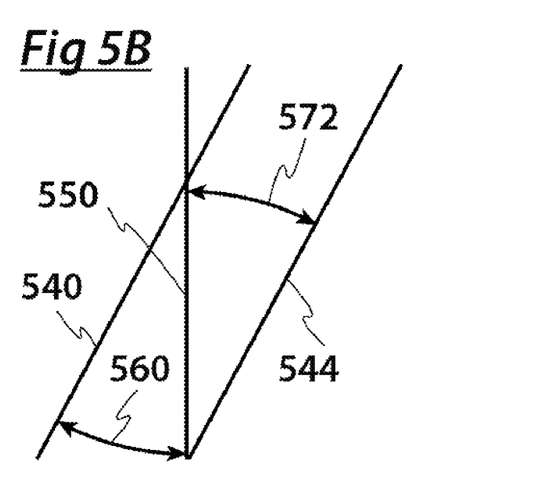

FIG. 5B is an illustration of an alternate geometric construction with a centerline 550, first line 540, and first angle 560 as in FIG. 5A. A second line 544 has a second angle 572 with respect to the centerline 550. As drawn in FIG. 5A, the angles 560, 570 are equal in magnitude and equal in sign. This is defined as anti-symmetric arrangement. It can also be stated that the first angle 560 and second angle 570 are anti-symmetrically disposed because they are equal in sign.

Figure 5C:
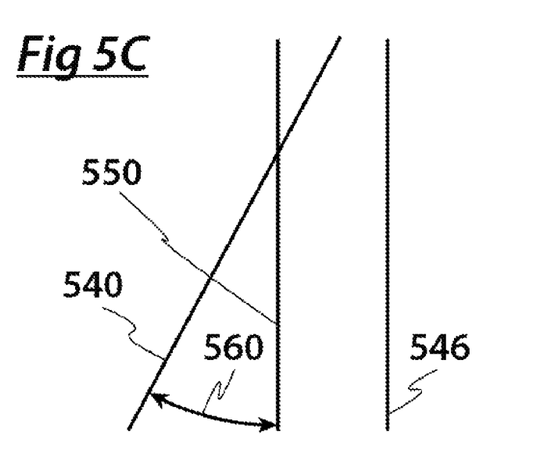

FIG. 5C is an illustration of yet another geometric construction with a centerline 550, first line 540, and first angle 560 as in FIG. 5A. A second line 546 is oriented to be parallel to the centerline 550. This is to say that the second line 546 has an angle of zero degrees with respect to the centerline 550. This is an example of an asymmetric arrangement because the first and second lines 540, 546 have angles that differ in magnitude.

Preferred folding aircraft have wing planforms which are substantially symmetric in design but are equipped with asymmetric wing folding features to allow folding portions of the wing to cross the aircraft centerline for increased compactness. In especially preferred aircraft, the wing folding axes angles are symmetrically disposed but asymmetric. One preferred aircraft has one wing folding axis parallel to the aircraft centerline and another that makes an angle with respect to the centerline.

Figure 6A:
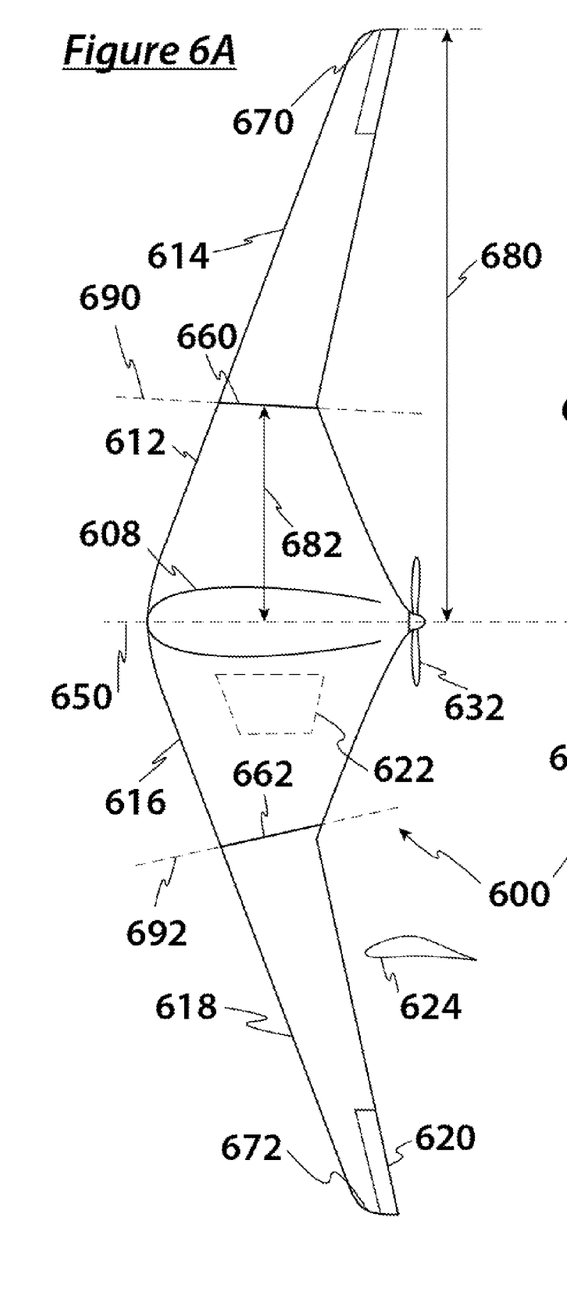
Figure 6B:
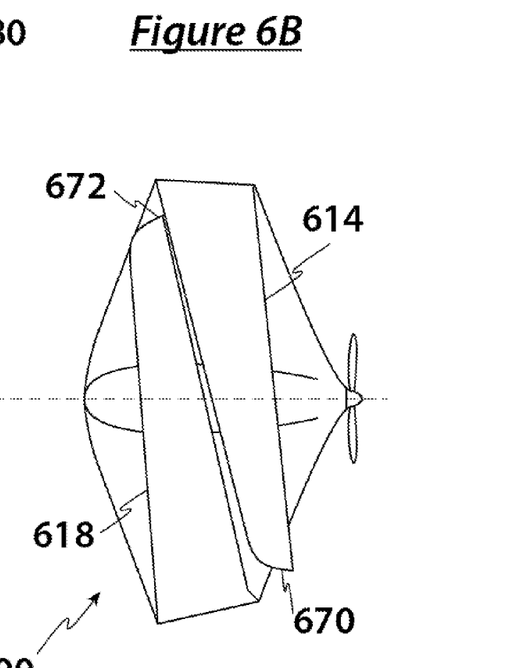
FIG. 6B is a plan view drawing of the same aircraft in a folded configuration.

FIG. 6A is a plan view of an especially preferred folding wing aircraft 600, while FIG. 6B is a plan view of the same aircraft 600 in an asymmetrical folded configuration. The aircraft 600 is a tailless, flying-wing configuration comprising a wing having a right inboard portion 612 rotatably coupled to a folding right outboard portion 614. A right folding hinge seam 660 separates these wing portions 612, 614. Likewise, a left inboard portion 616 is rotatably coupled to a folding left outboard portion 618 at a left holding hinge seam 662 by a hinge assembly (not shown). The right wing outboard portion 614 terminates in a right wing tip 670, while the left outboard portion terminates in a left wing tip 672. The aircraft 600 has a substantially symmetrical planform and layout which advantageously creates symmetrical aerodynamic and inertial properties. However, the provisions for wing folding are asymmetric in nature.

The aircraft 600 further comprises a centerplane 650 which defines left and right sides of the aircraft, and about which plane the wing planform is symmetric although the wing folding provisions are not symmetric. The aircraft has a means for propulsion 632 and a fuselage or other provision for payloads 608. The aircraft 600 also comprises a fuel tank 622 shown here disposed inboard of the wing folding seam.

The wing right outboard portion 614 folds about a first hinge axis 690 which has a first hinge angle with respect to the centerplane 650 in the plan view as shown. Similarly, the wing left outboard portion 118 folds about a second hinge axis 692 which has a second hinge angle with respect to the centerplane 650. For the preferred aircraft 600 of FIGS. 6A and 6B, the first and second hinge angles have different magnitudes, and thus are asymmetric but symmetrically disposed because they are opposite in sign. The angles are advantageously selected to allow the aircraft to fold compactly as shown in FIG. 6B. A first hinge angle magnitude is advantageously selected to be between 0° and 50°, 0° and 15°, or 1° and 5° of the centerplane. A second hinge angle has a larger magnitude than the first, between 5° and 50°, 5° and 15°, or 10° and 15° of the centerplane.

In normal sustained cruising flight, the aircraft 600 flies forward substantially along the x-axis, such that far-field streamlines are parallel to the aircraft centerplane 650. A consequence of orienting the wing folding hinge seams 660, 662 at a nonzero angle with respect to the aircraft centerplane 650 is that increased turbulent separation will occur as air passing over the seam can trip the boundary layer into turbulence. This degrades aircraft performance by increasing drag, and this performance degradation can be larger when the airfoils selected for the aircraft wing are natural laminar flow airfoils designed to achieve at least 5%, 10%, 20%, 30%, 40%, or even 50% of upper surface natural laminar flow at an aircraft cruise condition. One skilled in the art would not normally combine an airfoil profile shape configured for natural laminar flow with an upper surface laminar flow extent of at least 30% with an oblique seam, because the oblique seam will trip flow over a larger spanwise slice of the streamwise airflow, creating turbulent drag.

In the folded configuration, the aircraft 600 has a right wing tip 670 that lies on the left side of the centerplane 650 and a left wing tip 672 that lies on the right side of the centerplane 650. The wing folding hinges and folding hinge seams 660, 662 are advantageously configured such that the right first mean hinge distance 682 from the centerline is between 20% and 80%, 30% and 50%, or 33% and 40% of the aircraft wing right semispan 680. For maximum compactness, it will be seen that the left and right outboard wing portions do not touch or overlap in the folded configuration. Further, the left wing tip is forward of the right wing tip in the folded configuration. For the preferred aircraft of FIG. 6B, during folding, the wings rotate through an angle of at least 60°, 70°, or 80°.

Figure 6C:
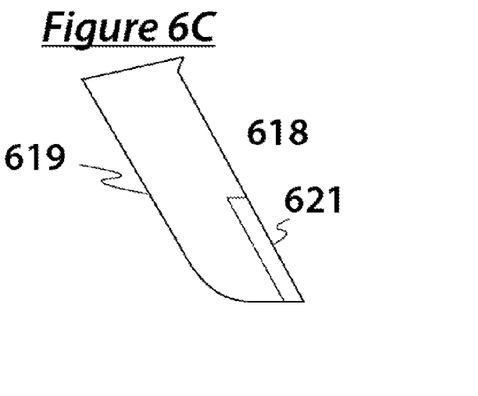
FIG. 6C is a plan view of a left replacement outboard wing portion for the aircraft of FIG. 6A.

FIGS. 6A, 6B, and 6C are drawn to scale with respect to each other. It can be observed that the left hinge seam length is 4.1% greater than the right hinge seam length. Further, the left and right mean hinge distances differ by 1%. The right wing mean hinge distance from the centerplane is 36.5% of the right wing semi span. The left and right folding hinge angles are asymmetric but symmetrically disposed. The right hinge angle magnitude is 3.45 degrees and the left hinge angle is 12.5 degrees. The wing left outboard portion has a projected planform area that is 0.88% greater than that of the right outboard portion. The total folding area is 65% of the non-folding planform area.

FIG. 6C is a plan view of an alternate replaceable left outboard wing 619 that can replace the wing left outboard portion 618. In especially preferred aircraft, the outboard wing portions 614, 618 are replaceable and can be uncoupled from inboard wing portions 612, 616 along the folding hinge seams 660, 662 at the hinge assemblies. In this manner, alternate outboard wings can be substituted allowing the aircraft to better perform across multiple roles and missions. It is contemplated that outboard wing replacement could be rapidly performed by ground crews. It is further contemplated that a system could be assembled comprising the aircraft 600, with a first left outboard wing portion 618 having a first planform, and also a second left replacement outboard wing portion 619 having a second planform that differs from the first planform as shown.

As shown in FIG. 6A, the aircraft 600 is advantageously configured with one or more control surfaces 620 on the wing outboard folding portion 618. A replaceable left outboard wing 619 can have an alternate control surface 621. It is contemplated that such control surfaces can be configured to be controlled by a flight control system, and can receive commands and power through lines that traverse the wing folding hinge. All suitable means for transmitting electrical or hydraulic power and signals across the wing fold hinge are contemplated including flexible wiring and tubing, sliprings, and other means.

Figures 7A, 7B:
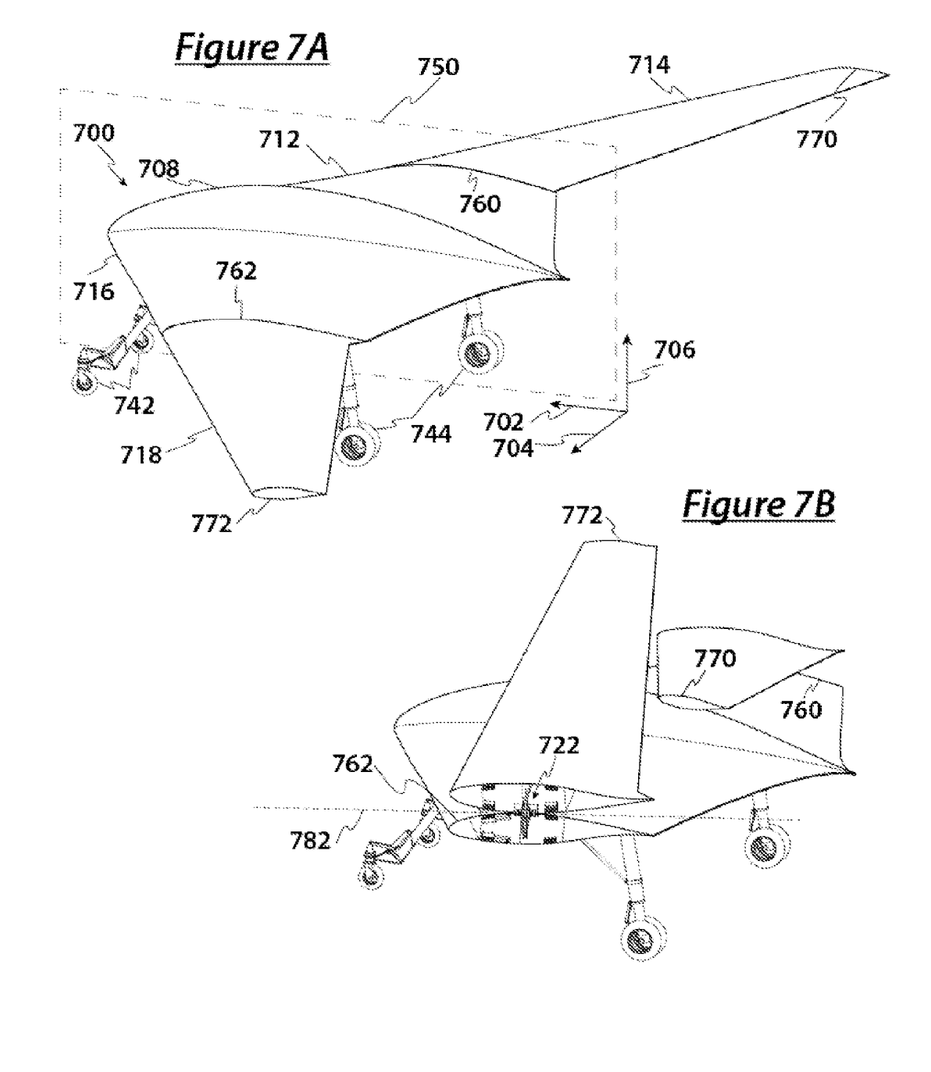
FIGS. 7A and 7B are perspective illustrations of an alternate especially preferred aircraft in unfolded and folded configurations, respectively.

FIG. 7A is a perspective view of an alternate especially preferred aircraft 700 in an unfolded configuration stationary on the ground after landing and before takeoff in accordance with the inventive concepts herein. The aircraft 700 is shown resting on a substantially flat and level landing surface (not shown) support but aft landing gear 744 and nose landing gear 742. An optional fuselage 708 or other payload accommodation sits on the upper surface of the wing and optionally protrudes on the lower surface. To accommodate a pilot, it is contemplated that the fuselage 708 could be configured to include a cockpit and means for controlling the aircraft. The aircraft 700 has no tail, empennage, rudder, horizontal stabilizer, or vertical stabilizer. As viewed from another perspective, the aircraft 700 has no control surfaces aft of the wing.

The aircraft 700 is bisected by a centerplane 750 oriented in the plane defined by the x-axis 702 and z-axis 706. The y-axis 704 extends in the spanwise or buttline direction. The orientation of objects can be referred to these axes.

The aircraft 700 has a wing comprising non-folding or fixed right and left inboard portions 712, 716 and replaceable folding right and left outboard portions 714, 718 having tips 770, 772. The upper and lower skin surfaces of inboard and outboard portions of the wings are separated by folding hinge seams 760, 762. In the folded configuration at its gross weight, aircraft 700 has a folded height that is 52% greater than the unfolded height.

In a preferred embodiment, to fold the aircraft, a pilot, operator, or automatic algorithm generates a folding command signal. Based on this signal, one or more actuators displace to rotate and fold the wing on one side of the aircraft. After the first wing has successfully been folded in place, actuators commence the folding of the second wing. Alternate embodiments are also contemplated in which the folding is entirely manual, in which the command is external to the aircraft, in which the motive power source is external or internal to the aircraft, and in which the actuation is external to the aircraft. Hydraulic, electrical, stored energy, and other actuation means are contemplated. Simultaneous folding of left and right wings is also contemplated.

FIG. 7B is a perspective illustration of the same especially preferred aircraft 700 after folding according to preferred methods. It can be readily observed that in this folded configuration, the a part of the right outboard wing, namely the right wing tip 770, is at least partially disposed on the left side of the aircraft 700 as defined by a centerplane 750. Similarly, the left wing tip 772 is at rest disposed over the right inboard wing 712 and supported by a left hinge assembly 722. The left hinge assembly 722 is configured and oriented along a left hinge axis 782 that has an orientation with respect the x-axis 702, y-axis 704, and z-axis 706. The left hinge axis is advantageously configured to have an oblique angle with respect to the x-axis 702 to allow for especially compact folding of a wing over an aircraft centerline.

Figure 8A:
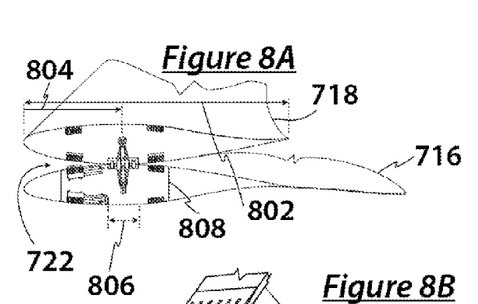
FIG. 8A is a side view illustration of a wing folding hinge assembly and its interface with inboard and outboard wing portions.

FIG. 8A is a side view illustration of a wing folding hinge assembly 722 and its interface with a wing inboard portion 716 and a folding wing outboard portion 718. The seam has a length indicated by arrow 802. In this preferred aircraft, the hinge assembly 722 is positioned chordwise along the wing at a position centered 37% of the seam length back from the wing leading edge as indicated by arrow 804. It is contemplated that by appropriate choice of materials and dimensions that wing folding could be mechanized using only a single hinge assembly 722 with a width 806 that is not more than 20% of the seam length and more preferably 11.5% of the seam length. In order to react the considerable bending moments that may result during folding or in the folded configuration, prior art systems have tended to use either multiple hinge assemblies in the chordwise direction or use very wide hinge assemblies. Preferred aircraft according to teachings herein use only a single hinge assembly 722 coupled to the wing with a titanium rib interface 808 to react these bending moments.

Figures 8B, 8C:
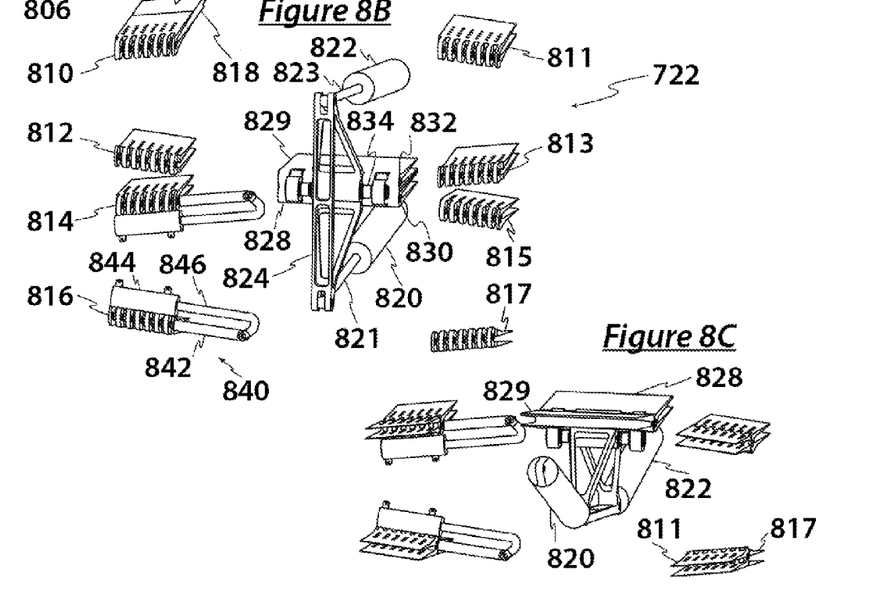

FIG. 8B is a detailed side view illustration of the same assembly in a folded configuration. Eight spar-pin attachments 810, 811, 812, 814, 815, 816, and 817 on the inboard and outboard wing portions 716,718 couple the wing in the unfolded (flight) configuration and transfer and react bending moments and other loads. In preferred embodiments, a spar-pin attachment 810 allows the coupling a wing spar cap 818 to an expanding pin 842, and is constructed of a metal such as titanium or steel. In this manner, the wing structure is allowed to carry loads across a folding joint.

Folding operations are mechanized by an outer actuator 822 comprising an outer actuator link 823 and coupled to the wing outboard portion 718 and an inner actuator 820 with an inner actuator link 821 and coupled to the wing inboard portion 716. The actuator links 821,823 are coupled to a wingfold truss 824 with pin joints. When powered and commanded, the actuators 820, 824 can drive the wing between folded and unfolded configurations through rotation about the hinge assembly 722.

The hinge itself comprises an inboard attachment plate 828 that is coupled to structure of the wing inboard portion 716 and an outboard attachment plate 829 coupled to the wing outboard portion 718. These plates are coupled to the wingfold truss 824 by a torque tube 834. A preferred hinge assembly has inboard and outboard hinge pins 830, 832 spaced in close proximity. As used herein, a "basic hinge" is defined as a hinge that has two hinge pins and, during rotation, the pins remain inside of an imaginary cylinder centered at the mean hinge pin location, the imaginary cylinder having a radius that is less than five times the diameter of the largest hinge pin. In this manner, it is seen that the operation of a "basic hinge" is similar to that of a simple hinge, in that it traces out a nearly-circular path during operation. A simple hinge is one in which the object moves in a circular pattern; while complex hinge has displacement also.

A retractable expanding pin 842 can be inserted in the interleaving portions of spar-pin attachments 816, 810 to lock the wing into the unfolded position. A pin actuator 844 drives an arm 846 coupled to the expanding pin 842 with an articulated joint. This is referred to as a wingfold locking assembly 840.

FIG. 8C is a side view illustration of the same hinge assembly in an unfolded configuration. The actuators 820, 822 are in fully retracted positions, and spar-pin attachments 811, 817 are mated and ready to be locked in place by an expanding pin.

While the subject matter disclosed herein allows for more compact folding of an aircraft, it also entails certain complications not found in prior art systems. In general, an engineer will strive to design and build systems of low complexity and high strength. The presently disclosed wing folding systems are asymmetric which can increase considerably the engineering and manufacturing work required. Also, an engineer would normally place seams or joints either in a streamwise direction or normal to structural surfaces because loads are devolved in one of those two directions and because they usually result in lower seam lengths and thus lower structural masses. It is contemplated that when oblique, asymmetric seams are used, additional structure may be required for strength and stiffness as compared to simple streamwise joints.

Viewed from another perspective, the material herein provides a method of folding an aircraft having a wing with left and right wing hinges. Preferred wings have spans of 40, 60, 80, 100, 120, 140, or even 160 feet although other spans are also contemplated in the range of 1 to 300 feet. Folding comprises folding the wing at the wing hinges such that at least one of the left and right tips of the wing each pass over a centerline of the aircraft.

It should be apparent to those skilled in the art that many more modifications besides those already described are possible without departing from the inventive concepts herein. For example, the teachings regarding folding can be applied to rotorcraft and helicopter rotors. Alternately, this could be applied to folding wings of aircraft having more than one each left and right wings, or to folding tails or other surfaces. Some embodiments are contemplated in which the wings at least partially overlap in the folded configuration, and still others are contemplated where only the right or left wing has a folding hinge. Where folding of oblique wings is desired, folding may be performed parallel to far-field streamlines for compactness to achieve the same effect. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft, comprising:
a centerplane defining right and left sides of the aircraft;
a wing;
a right wing folding hinge on a right side of the wing, a right hinge oriented at a right hinge angle with respect to the centerplane;
a left wing folding hinge on a left side of the wing, a left hinge oriented at a left hinge angle with respect to the centerplane; and
the right hinge angle having a magnitude that differs from a magnitude of the left hinge angle by at least two degrees.

2. The aircraft of claim 1, wherein the right hinge angle magnitude differs from the left hinge magnitude by at least five degrees.

3. The aircraft of claim 1, wherein the right wing folding hinge is disposed at a right mean hinge distance from the centerplane, and the left wing folding hinge is disposed at a left mean hinge distance from the centerplane, and a magnitude of the right mean hinge distance differs from a magnitude of the left mean hinge distance by at least two percent.

4. The aircraft of claim 1, wherein the wing has left and right tips corresponding to left and right sides of the aircraft, respectively, in an unfolded configuration, and the left hinge is disposed with a location and an orientation with respect to the centerplane such that the left wing tip lies on the right side of the centerplane in a folded configuration.

5. The aircraft of claim 1, wherein the wing has left and right non-folding planform areas, and left and right left folding planform areas, and a sum of the left and right folding planform areas are at least 60% of a sum of the left and right non-folding planform areas.

6. The aircraft of claim 1, wherein the wing has a left wing hinge seam with a first length, a right wing hinge seam with a second length, and the first length that differs from the second length by at least 5%.

7. The aircraft of claim 1, wherein the aircraft has no empennage.

8. The aircraft of claim 1, wherein the wing has an airfoil profile shape configured for natural laminar flow with an upper surface laminar flow extent of at least 30%.

9. The aircraft of claim 1, wherein all of the folding of a left outboard portion of the wing relative to a left inboard portion of the wing occurs about a single hinge.

10. The aircraft of claim 1, wherein the right wing folding hinge is disposed at a right mean hinge distance from the centerplane that is less than 45% of a right wing first semi-span.

11. A system comprising the aircraft of claim 1, wherein the wing has a left outboard wing portion having a first planform, and further comprising a left replacement outboard wing portion having a second planform that differs from the first planform.

* * * * *